United States Patent [19]

Brauer et al.

[11] 4,008,197

[45] Feb. 15, 1977

[54] MINERAL OIL EXTENDED POLYURETHANE SYSTEM CONTAINING A COUPLING AGENT FOR DECONTAMINATING AND SEALING THE INTERIOR SPACES OF AN INSULATED ELECTRICAL DEVICE

[75] Inventors: Melvin Brauer, E. Brunswick; Thaddeus Frank Kroplinski, Bound Brook, both of N.J.

[73] Assignee: N L Industries, Inc., New York, N.Y.

[22] Filed: Nov. 17, 1975

[21] Appl. No.: 632,180

Related U.S. Application Data

[63] Continuation-in-part of Ser. No. 432,479, Jan. 11, 1974, abandoned.

[52] U.S. Cl. .......................... 260/31.6; 260/31.2 N; 260/31.8 C; 260/31.8 H; 260/32.8 N; 260/33.6 UB
[51] Int. Cl.[2] ..................... C08K 5/01; C08K 5/07; C08K 5/10
[58] Field of Search ............. 260/33.6 UB, 31.2 N, 260/31.6, 31.8 H, 31.8 C, 32.8 N

[56] References Cited

UNITED STATES PATENTS

| 3,755,241 | 8/1973 | Brady | 260/33.6 UB |
|---|---|---|---|
| 3,846,355 | 11/1974 | Mayer | 260/33.6 UB |
| 3,886,111 | 5/1975 | Yashimura et al. | 260/31.2 N |

*Primary Examiner*—Allan Lieberman

[57] ABSTRACT

This invention provides a method of sealing and purging contaminants from the internal free spaces of an insulated electrical device by forcing into said free spaces a low viscosity material that acts to displace fluid contaminants from within said free spaces. The material later cures in situ to form a hydrophobic seal with good electrical properties. Also disclosed herein is a method for rehabilitating waterlogged plastic insulated multiconductor communications cables of the type employed in telephone systems.

8 Claims, 1 Drawing Figure

U.S. Patent   Feb. 15, 1977   4,008,197
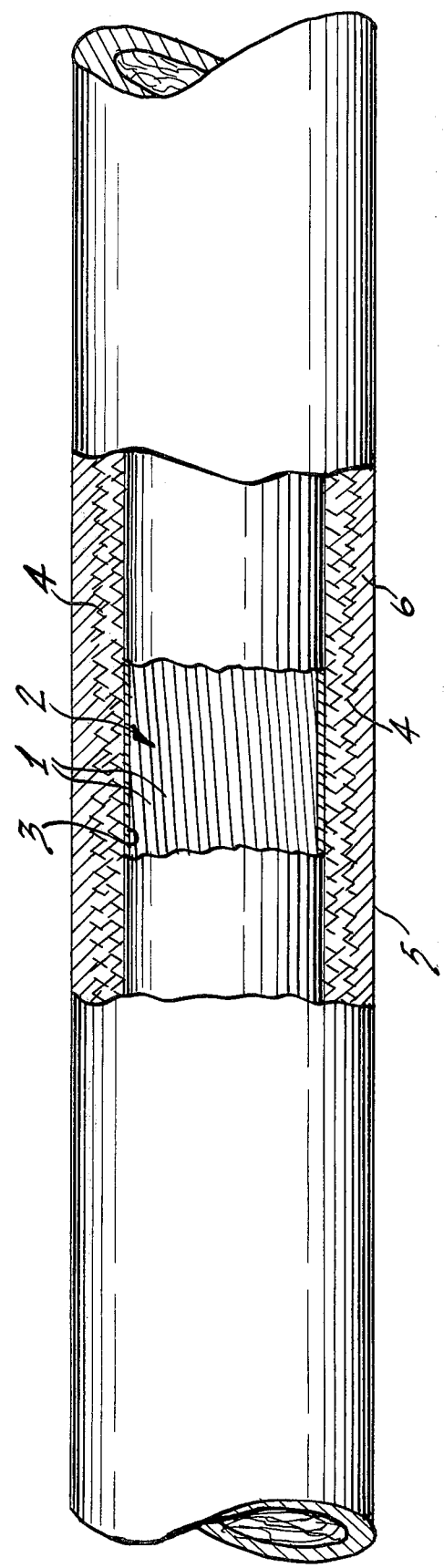

MINERAL OIL EXTENDED POLYURETHANE SYSTEM CONTAINING A COUPLING AGENT FOR DECONTAMINATING AND SEALING THE INTERIOR SPACES OF AN INSULATED ELECTRICAL DEVICE

This application is a continuation-in-part of our patent application Ser. No. 432,479 filed on Jan. 11,1974 and now abandoned.

This invention relates to a method of rehabilitating insulated electrical devices that have been contaminated by fluid penetration of their interior free spaces. More specifically, the invention concerns a method for displacing aqueous fluid penetrants from the interior free spaces of an insulated electrical apparatus and sealing the purged spaces against further aqueous fluid penetration while maintaining the electrical properties of the apparatus.

Water penetration of insulated electrical devices and especially plastic insulated multiconductor telephone cables can seriously effect the electrical properties of such structures. The problem of water penetration is amplified when the electrical device is positioned underground or in a high humidity environment. In the case of a telephone cable, water penetration can seriously impair the electrical and mechanical improperties that are critical to its continued operation. The pressure of water between insulated conductors can cause a significant increase in their capacitance and can lead to the development of electrical leakage pathways between conductors having pinhole insulation defects. Leakage of water into the unoccupied spaces between the insulated cable pairs and the outer sheath can also cause a significant increase in signal attenuation, noise, and lead to conductor corrosion.

Replacement of waterlogged cables is not a satisfactory solution to the problem of water contamination in most cases because of the expense and inconvenience involved in such an undertaking. However, in order to maintain suitable operating parameters the cable must be rehabilitated by removal of the fluid contaminant and restoration of the electrical and mechanical conditions that render it useful as a means for transmission of telephone signals.

The prior art has advanced several methods of eliminating aqueous penetrants from the interior free spaces of plastic insulated conductor cables. One technique involves the use of acetone to eliminate water. Removal of water, alone, is not sufficient in most cases since the means for water penetration is not eliminated and unless a continuous supply of acetone is maintained in the cable, renewed fluid penetration can be expected to occur. Another method of purging water contaminants depends upon pumping a gas into the interior free spaces of the cable via a coupling to the outer cable sheath and maintaining a continuous elevated gas pressure between interconnected cable segments. This method is impractical for use in most cases since it requires the continued operation of a gas generating source in order to prevent subsequent water penetration.

A recently developed technique removes water that has penetrated into the interior free spaces of a telephone cable by pumping a hydrophobic insulating material into the cable. The insulating material is introduced at low viscosity and cures in place to a high viscosity thus precluding its escape via defects in the outer covering of the cable. The cured material simultaneously acts as a hydrophobic barrier to subsequent water penetration. This system employs a cross-linking composition which is a solution of a liquid urethane elastomer in an aromatic oil. A principal disadvantage of this system is that after the reclamation agent has cured in place, the aromatic hydrocarbon oil can escape from the cross-linked system and severely attack the plastic conductor connectors, or polyolefin sheathing.

In addition to the water elimination, low viscosity, and barrier properties previously set forth a rehabilitation material for use in sealed electrical devices must fulfill other critical requirements. It must be compatible with plastic connectors (such as polycarbonates), normally employed in joining lengths of telephone cable. compatibility with polyolefins is important and an effective rehabilitation agent should not stress crack these materials which frequently form the insulating sheath of telephone cables. The agent should also have good mechanical properties, relatively long life expectancy and a relatively flat viscosity-time curve to insure good pumpability and to enable longer cable segments to be rehabilitated and filled in a single application.

It is also important that a cable rehabilitation agent display superior electrical characteristics such as high insulation resistance, volume resistivity dissipation factor and low dielectric constants since in most cases it must rehabilitate the cable with respect to these properties. Additionally, the reclamation agent should have a low specific gravity in order to impart a minimal weight gain to he rehabilitated cable and less water and air entrapment which can result from the turbulence effects of pumping into a confined cable space. Also, the rehabilitation compound should not attack polyethylene terephthlate or other synthetic polymer materials employed in cable construction.

Finally, current health and safety regulations make it imperative that a rehabilitation agent be relatively non-toxic, non-volatile and easy to handle in the field.

It is therefore an object of this invention to provide a method of eliminating water that has penetrated the interior free spaces of an insulated electrical apparatus and to simultaneously provide a barrier to prevent subsequent water penetration.

Another object of the invention is to rehabilitate the electrical properties of an insulated electrical apparatus that has become waterlogged.

A further aspect of the invention is to dislodge aqueous contaminants from the interior free spaces of a plastic insulated multiconductor telephone cable by introduction of a cable rehabilitation compound under pressue over lengthy cable spans in a single operation.

Another aspect of this invention is the provision of a low viscosity agent capable of eliminating aqueous contaminants from the interior free spaces of an insulated electrical cable and which cures in situ to provide a permanent barrier to subsequent water penetration.

These and other objects of the instant invention will be better understood by reference to the following specification and the accompanying drawing wherein:

FIG. 1 is a front elevational view, partly in section, of a length of plastic insulated multi-conductor telephone cable.

The generic aspect of the instant invention involves a method of eliminating water that has penetrated the interior free spaces of an insulated electrical apparatus by forcing into the free spaces of the apparatus a rehabilitation agent comprising a low viscosity solution of urethane precursors that are extended in a mineral oil. The rehabilitation agent is introduced into the apparatus at very low viscosity by pumping. Continuous introduction of the low viscosity agent is maintained in order to drive it along the length of the free spaces throughout the electrical apparatus. The rehabilitation compound initially displaces aqueous contaminants, such as water, that have penetrated into the interior free spaces between the different components of the insulated device. Thereafter, the low viscosity agent cures in situ to form a gel-like urethane structure in which the mineral oil is retained. In this manner, water contaminants are removed from the insulated electrical arrangement, a barrier is formed against further water penetration and the electrical properties of the device are restored. This technique is especially useful in the rehabilitation of plastic insulated conductor cables.

A specific embodiment of this invention employs a two-component urethane cable rehabilitation agent extended with a mineral oil. Polyurethanes, being very polar elastomers, were heretofore thought to be almost completely incompatible with the non-polar minerals oils and extension of urethanes was traditionally accomplished with aromatic oils. Although the prior art has been able to achieve some extension of polyurethanes using mineral oils, these efforts have been limited to relatively low extension ratios of about 2:1, oil to polymer. At higher extension ratios these prior art systems begin to lose their oil contents by exudation (or spewing) shortly after cure. We have found that the coupler is necessary in our systems which comprises castor oil, polyether polyols in combination with hydroxyl bearing polybutadiene and a diisocyanate to obtain stable non-spewing elastomeric materials with extensions even as low as 1:1 and up to 10:1 if desired. Without the coupler the elastomer spews oil.

For purposes of this specification, mineral oils are considered to be those aliphatic, cycloaliphatic, and branched aliphatic saturated hydrocarbons that contain from 15–20 C atoms and are distilled from petroleum. Included in this classification are naphthenic and paraffin oils. Paraffin oils are the preferred mineral oil for use in this invention. In the instant invention it was unexpectedly found that a cross-linkable low viscosity solution of a mineral oil, a preselected polyol and a preselected isocyanate prepolymer, in which either the prepolymer or the polyol constituent contain a polybutadiene moiety can be prepared through the use of liquid coupling agents that are preferably high boiling esters of organic diacids or diols. More specifically, the coupling agents may be saturated or unsaturated (preferably unsaturated) aromatic-aliphatic, cyclo-aliphatic or wholly aliphatic esters, such as 2,2,4-trimethyl 1,3 pentane diol diisobutyrate. Other suitable liquid coupling agents include those in which a polar group is attached to an alkane structure, such as, for example, tributyl phosphate.

In order to effectively compatibilize the mineral oil with a cross-linking urethane elastomer, it has been discovered that a coupler must satisfy several criteria. Firstly, it must be soluble in mineral oils in all proportions. In other words, the coupler should be miscible in all proportions with mineral oils to form a true solution (i.e., one part coupler/99 parts mineral oil or 99 parts coupler/one part mineral oil). It has also been found that coupler compounds suitable for use in this invention have a solubility parameter ($\delta$) in the range of 7.0 - 9.5 and a hydrogen bond index number within the range 6 to 12.

The ($\delta$) value of a substance is calculated according to the formula $$\delta = (\Delta E/V)^{1/2}$$

where $\Delta E$ is the energy of vaporization to a gas at zero pressure (i.e., an infinite separation of the molecules); and V is the molar volume of component present. The dimensions of $\delta$ are (calories per cubic centimeter)$^{1/2}$. Since it is possible to ascertain $\Delta E$ and V for most substances, the value of the solubility parameter or $\delta$ may be calculated from the heat of varporization $\Delta H$, since it can be shown that $$\Delta E_{25°\ C} = \Delta H_{25°\ C} - 592$$

Since the value of $\Delta H$ at 25° C for most compounds may be found in the literature, this value may be used to calculate $\Delta E$ and then $\delta$. Further details on solubility parameters and means for their calculation are found in an article entitled Solubility Parameter Values by H. Burrell and B. Immergut at P.IV-341, of Polymer Handbook edited by J. Brandrup and E. H. Immergut, 3rd Edition Interscience Publ., June 1967.

It has also been determined that the coupling agents of this invention have a hydrogen bond index in the range 6.0 - 12.0. The hydrogen bonding index number ($\gamma$) of a compound is a measurement of its proton (hydrogen) attracting power. The hydrogen bond index number ($\gamma$) (proton attracting power) of a compound is measured by comparing the relative strengths of the hydrogen bonds which the liquid compounds forms with a common proton or Deuterium donor.

In practice, this is done by dissolving deuterated methanol in the liquid to be tested. The proton attracting power of a liquid compound is determined by measurement of the movement produced on the OD vibrational band of $CH_3OD$. The OD vibrational band occurs at $4\mu$ in the liquid $CH_3OD$ and at $3.73\mu$ in the monomolecular $CH_3OD$ in dilute benzene solution. Benzene is considered to have an OD vibrational shift of 0. The formation of hydrogen bonds shifts the monomolecular band to lower frequencies or longer wavelengths. The stronger the proton attracting power of a liquid, the greater is the shift which it produces on the OD band. By Infrared Spectroscopy the perturbations of the OD band can be established.

The $\gamma$ value of a compound may be determined by measuring the shift in wave numbers of the OD vibrational band after disolution in the liquid compound and dividing the resulting number by 10. (Wave number is the reciprocal of an angstrom unit). Those compounds having a $\gamma$ number of 0 to 6.0 are generally acknowledged to be weak hydrogen bond acceptors. Compounds having index numbers in the range of 6.0 to 12.0 are usually considered moderate hydrogen bond formers and those having index numbers above 12.0 are considered to be strong hydrogen bonders. The liquid coupler compounds useful in this invention are those having a hydrogen bond index number ($\gamma$) falling in the range between 6.0 and 12.0 as determined by the abovementioned technique. The origin of the Hydrogen Bond index system and additional details on the means for its computation are found in a series of articles by W. J. Gordy in J. Chem. Physics, Vol. VII, pp.

93-99, 1939, Vol. VIII, pp. 170-177, 1940 and Vol. IX, pp. 204-214, 1941.

Coupler compounds are selected to be non-reactive with the cross-linkable urethane elastomer composition and accordingly do not contain any labile hydrogen atoms in their structure.

As indicated above, it is important that the viscosity of the solvent, coupler and polymer solution be kept to a minimum in order to effect their introduction into the free spaces of a cable that is to be reclaimed. However, the amount of polymer in the rehabilitation composition should also be minimized to the greatest extent possible in order to prevent excessive weight gain in the apparatus to be rehabilitated as well as for reasons of economy.

In order to provide suitable mechanical and electrical properties for reclamation of insulated electrical devices, within a reasonable period of time at ambient temperature, the gelled paraffinic oil extended elastomer system should be cross-linked. Cross linking is obtained by use of either an isocyanate or a polyol, more usually a polyol having a functionality of between 2.0 and 3.0, and preferably 2.2–2.7. Also, the volume resistivity of the paraffin extended polyurethane as determined by ASTM D-257 should be at least $2.5 \times 10^{10}$ ohm-cm and preferably higher.

The instant mineral oil extended rehabilitation compounds are preferably prepared on the site by admixing the contents of two separate containers. In this manner instruction of personnel in the formulation and use of the rehabilitation material is facilitated because the contents of the two containers are preferably mixed in approximately equal proportions just prior to their introduction into the apparatus to be reclaimed. If necessary, all the individual ingredients can be admixed together on the site.

In one container is an isocyanate terminated prepolymer, preferably in mineral oil solution. Between about 50 and 200, and preferably about 100 grams of isocyanate prepolymer is employed per liter of solution in the first container. The prepolymer is preferably formed from a cycloaliphatic diisocyanate such as, for example, 3-isocyanato methyl, 3,5,5-trimethylcyclohexy isocyanate (IPDI). The useable isocyanates for making the prepolymers in this invention also include the aliphatic and aromatic diisocyanates such as tolylene diisocyanate (TDI), 4,4'-diphenylmethane diisocyanate (MDI), 1,5-naphthalene diisocyanate, phenylene diisocyanates, or mixtures of these materials, 4,4'-methylene bis(cyclohexyl isocyanate) and hexamethylene diisocyanate, as well as related aromatic and aliphatic isocyanates, which may also be substituted with other organic or inorganic groups that do not adversely affect the course of the chain-extending and/or crosslinking reaction.

Formation of the isocyanate terminated prepolymer is accomplished by reacting an excess of one of the preceding isocyanate components with a polyol having a relatively high molecular weight of between about 1,000 and 6,000. Among the polyols useful in formation of the isocyanate terminated prepolymer are those selected from compounds based essentially on polybutadiene, castor oil or hydroxyl bearing polyethers or combinations of them.

Suitable polyether polyols include aliphatic alkylene glycol polymers exemplified by polypropylene ether glycol and poly 1–4 butylene ether glycol. Also trifunctional compounds exemplified by the reaction product of trimethylol propane and propylene oxide may be employed as the polyol constituents.

The polybutadiene based polyols are liquids that are founded on hydroxyl terminated liquid butadiene homopolymers and hydroxyl terminated butadiene copolymers with styrene. A typical butadiene based polyol copolymer has the approximate structure

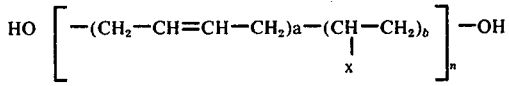

wherein
X is $C_6H_5$ for a styrene-butadiene copolymer and
$a = .75$
$b = 0.25$ and $n = 57$–$65$ A butadiene homopolymer useful in preparing the isocyanate terminated prepolymers of the invention has the structure

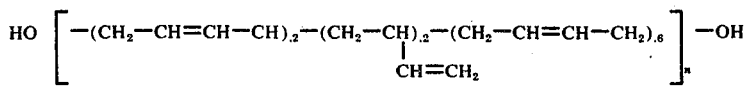

wherein $n = 57$–$65$

This class of liquid hydroxy bearing polybutadiene polymers are available from Arco Chemical Company under the trademark POLY-BD.

Properties of the hydroxyl-terminated polybutadienestyrene copolymers are
Butadiene, Wt. % = 75
Styrene, Wt. % = 25
Viscosity, poise at 30° C = 225
OH content meg./gm = 0.65
Moisture — Wt. % = 0.05
Iodine Number = 335

The prepolymer is preferably formed from the reaction of an excess of IPDI and the above-mentioned hydroxyl terminated homopolymer of polybutadiene and has a hydroxyl functionality of 2.2 – 2.4 and an equivalent weight of approximately 1260. Another prepolymer formulation that has been found especially useful in preparing mineral oil extended cable rehabilitation agents is formed by reacting an excess of toluene diisocyanate with castor oil or a hydroxyl terminated polybutadiene homopolymer or a polyether (such as poly(oxypropylene) glycol or polytetramethylene glycol). The preferred castor oil composition for use in preparation of this prepolymer and generally in this invention comprises a mixture of about 70% pure glyceryl triricinoleate and about 30% glyceryl diricinoleate-monooleate or monolinoleate and is available from Baker Castor Oil, Bayonne, New Jersey, as "DB oil".

In the second container is a solution of between about 75 and 200 and preferably about 150 grams per liter of a preselected polyol in mineral oil. Suitable polyols with which the polyisocyanate prepolymers in the first container may be reacted include castor oil, polyethers such as poly tetramethylene glycol, homopolymers or copolymers of hydroxyl, bearing butadiene, poly (oxypropylene) glycol or combinations of them.

The mineral oil component may be admixed with either or both of the prepolymer or polyol stages as long as a sufficient amount of the liquid coupler agent is present to compatibilize the mineral component with the respective stage.

The molecular weight (mw.) of the polyols used in this second part of the system should fall between about 1000 and 6000 and preferably in the range 2,000 – 4,000. The molecular weight of the polyols used to form the prepolymer also lies within the same range. Preferably, the polyol reactant is a hydroxyl bearing polymer of either repeating butadiene monomer units or a copolymer of butadiene and styrene. In fact, it has been determined that in order to secure effective operation and compatibility of a mineral oil in a urethane elastomer system, either the polyisocyanate prepolymer or the polyol must include a polybutadiene moiety as part of their structure. While it is not important whether the polybutadiene moiety is present in the prepolymer portion or the polyol precursor of the polyurethane system, it has been determined that full compatibility of the mineral oil/polyurethane system (especially in highly extended systems) is not obtained absent the presence of the butadiene moiety in the polyurethane structure.

The mineral oil extended polyurethane is deemed to be a compatible system since either or both of the prepolymer or the polyol can accommodate the mineral oil and go on to form a polyurethane polymer that cures to a gel but does not exude the extender oil after cure. Accordingly, compatibilizing refers to the ability of the cured polyurethane system to retain the mineral extender oil within its structure while remaining in a gel-like consistency. Once the oil has been compatabilized with the polyurethane structure it is not lost by spewing or exudation after cure. Determination as to the proper amount of coupler for use in compatabilizing a given quantity of mineral oil with a specific prepolymer or polyol formulation is best done by experimentation, although it has been determined that the completed urethane elastomer system should contain about 8 to about 20 and preferably between about 12½ and 15 parts by weight of polymer solids, between 60 and 75 and preferably between 65 and 70 parts by weight mineral oil and between about 10 and 25 preferably between about 15 and 20 parts by weight of coupler. In one preferred embodiment a hydroxy bearing homopolymer of butadiene is reacted with an excess of 3-isocyanatomethyl 3,5,5 trimethylcyclohexyl isocyanate in the presence of 2,2,4-trimethyl 1-3, pentanediol diisobutyrate coupling agent to form a prepolymer which is in turn diluted in mineral oil and an additional amount of coupler. The dilute prepolymer solution is then reacted with a dilute solution of the hydroxy bearing butadiene homopolymer in mineral oil and the same liquid coupling agent to yield an elastomer system having the following make-up:

(Polymer) Solids 15 parts by weight
(Extender oil) Paraffin 64 parts by weight
  Coupler 20 parts by weight
  Catalyst 1 part by weight The composition ranges cited above cover the preparation of highly oil extended polyurethanes possessing gel-like consistencies. However, this invention also covers the preparation of lower oil extended polyurethane elastomers. The broad ranges therefore contemplated by the instant invention covering both types of products comprise from about 8 to about 45 parts by weight of polymer solids, from about 25 to about 75 parts by weight of mineral oil and from about 10 to about 35 parts by weight of coupler.

For the lower oil extended polyurethanes contemplated by the instant invention which are useful for casting systems for a variety of potting and encapsulating applications the ranges should comprise from about 20 to about 45 parts by weight of polymer solids, from about 25 to about 60 parts by weight of mineral oil and from about 25 to about 35 parts by weight of coupler.

The liquid couplers employed to compatibilize mineral oils with the instant polyurethane systems and to secure both high and low oil/polymer extension ratios according to this invention are selected according to the previously enumerated criteria. Generally, the initial criteria is that the coupler liquid must be soluble in mineral oils in all proportions to form a true solution.

The coupler compounds will also possess a solubility parameter ($\delta$) between 7.0 and 9.5 preferably in the range between 7.2 and 9.5.

Final evaluation of a coupling agent is usually made with reference to its hydrogen bonding index ($\gamma$) the preferred coupling agents having hydrogen bonding index numbers in the range 8.2 to 8.8 as determined by the procedures previously set forth. In the screening of potential coupling agents as determination as to solubility parameter and hydrogen bonding index number can be made using well-known analytical techniques. The solubility parameter value ($\delta$) and hydrogen bonding index number ($\gamma$) are available in the literature for many compounds and may be determined by reference to the appropriate text.

From the chemical standpoint, the couplers are liquids and preferably esters of organic diacids or diols that boil at temperatures in excess of 220° F. Other suitable coupling agents include those liquids in which a polar group is attached to an alkane structure such as, for example, tributyl phosphate. The liquid coupling agents may be saturated or unsaturated (although they are preferably saturated) and may be aromatic-aliphatic, cyclo-aliphatic, or wholly aliphatic esters, such as for example 2,2,4-trimethyl 1,3 pentanediol diisobutyrate.

The preferred couplers for use in this invention are selected from among di-2-ethylhexyl sebecate, acetyl tributyl citrate, di-2-ethylhexyl adipate, dioctyl adipate, dibutyl fumarate, di-n-butyl sebecate and di-2-ethylhexyl citrate and acetyl di-2-ethylhexyl citrate. Especially good results are obtained when 2,2,4 trimethyl-1-3 pentanediol diisobutyrate is employed as the coupling agent. A list of the principal coupling agents that have thus far, been found useful in this invention is set forth in Table A:

TABLE A

| COUPLERS | |
|---|---|
| Chemical Name | ($\delta$) (Cal/per CC) |
| 1. 2,2,4 Trimethyl-1-1,3 Pentanediol Diisobutyrate | 8.2 |
| 2. Di-2-ethylhexyl Sebecate | 8.6 |
| 3. Acetyl Tributyl Citrate | 9.2 |

TABLE A-continued

| COUPLERS | |
|---|---|
| Chemical Name | (δ) (Cal/per CC) |
| 4. Di-2-ethylhexyl Adipate | 8.7 |
| 5. Diisodecyl Phthalate | 7.2 |
| 6. Dioctyl Adipate | 8.7 |
| 7. Tributyl Phoshate | 8.6 |
| 8. Dibutyl Fumarate | 8.5 |
| 9. Acetyl Tri-2-ethylhexyl Citrate | 8.6 |
| 10. Di-n-butyl Sebecate | 8.8 |
| 11. Dioctyl Phthalate | 8.8 |
| 12. Di-2-ethylhexyl citrate | 8.6 |
| 13. Isobutyl Acetate | 8.4 |
| 14. Methyl ethyl Ketone | 9.5 |
| 15. Methyl-n Butyl Ketone | 8.6 |

Selection of a particular coupler determination of the correct amount to be employed is determined by experimentation and will vary from one urethane system to another. The selection is dependent upon chemical and physical differences in various prepolymers and polyols as well as upon the desired amount of mineral oil extension in the cured system.

The couplers of this invention enable paraffin oil extensions of up to about 950% (by weight) based upon polyurethanes, formulated from polyether diols and triols, castor oil, as well as polybutadiene polyols and combinations of these. These mineral oil extended urethane elastomer systems display dielectric constants of 3.4 at 1Khz (as determined by ASTM D-150) or lower. Examples I-XII illustrate the preparation of mineral oil extended urethane elastomers for use in rehabilitating insulated electrical devices. Table B outlines the functionality and molecular weights of the polyols employed in Examples I-XII.

TABLE B

| Polyol | OH Functionality | MW |
|---|---|---|
| 1. Polybudadiene | 2.3 – 2.4 | 2912 – 3038 |
| 2. Styrene polybutadiene copolymer | 2.0 | 3280 |
| 3. Castor oil | 2.7 | 923 |
| 4. Polypropylene/glycol | 2.0 | 2040 |
| 5. Trimethylolpropane propylene oxide adduct | 3.0 | 4145 |
| 6. Polytetramethylene Glycol | 2.0 | 2004 |

Table C contains a summary of the important physical and chemical properties of the Prepolymer components of Examples I-XII. (See Table C attached).

The important physical and electrical properties of the various oil extended systems prepared in Examples I-XII are summarized in Table D. (See Table D attached).

Example I illustrates the understanding of the prior art that polyurethanes, being very polar elastomers are almost completely incompatible with mineral oils. The results of this example reveals that a mineral oil cannot be used to obtain a compatible highly extended polyurethane (i.e., at least about 300% polymer extension) system in the absence of couplers of the type described in this invention. Attempts to achieve high degrees of polyurethane extension with mineral oils and without a suitable coupler result in an incompatible system which spews oil during and after cure and is accordingly unsuitable for reclamation of insulated electrical devices (e.g., plastic insulated conductor cables, transformers, capacitors).

EXAMPLE I a. Prepolymer Formation

A reactor fitted with agitator, thermometer, nitrogen inlet and reflux condenser was charged with 3120.0 grams (2.5 eq.) of a hydroxyl bearing polybutadiene, 833.0 grams of 3-isocyanatomethyl, 3,5,5 trimethylcyclohexyl isocyanate (7.5 eq.), 3953.0 grams of paraffin oil and 4.0 grams of benzoyl chloride. The solution was maintained at 75°–85° C for 5 hours under nitrogen. The free isocyanate content of the prepolymer was 2.56%.

b. Polymer Formation 25.0 grams (.014 eq.) of the prepolymer was mixed with 16.8 grams (.014 eq.) of a hydroxyl bearing polybutadiene, 57.8 grams of a paraffin oil and 0.4 grams of dibutyl tin dilaurate.

TABLE C

| | | | Prepolymers | | | |
|---|---|---|---|---|---|---|
| Polyol | Isocyanate | NCO/OH | % Free NCO | Equivalent Wt. Per NCO Group | Viscosity (CPS) | Example Prepolymer Used in |
| 1 | IPDI | 3 | 2.56 | 1641 | 475 | I, II, III, IV, XI |
| 1 | TDI | 3 | 2.57 | 1635 | 330 | V |
| 3 | TDI | 2.47 | 10.8 | 389 | 20,000 | VII, VIII, X, XII |
| 3 | Polymeric MDI | 5.14 | 7.2 | 584 | 150 | XIII |
| 5 | IPDI | 3 | 4.85 | 866 | 4260 | VI |
| 6 | IPDI | 5 | 10.12 | 415.2 | 3850 | IX |

TABLE D

| Example No. | Coupler No. | % Coupler/Wt. | % Polymer/Wt. | % Paraffin Oil/Wt. | % Polymer Extension | Dielectric Constant At 1KH$_z$* | Volume Resistivity In OHM-cm* | Dissipation Factor At 1KH$_z$* |
|---|---|---|---|---|---|---|---|---|
| I - Control | None | 0 | 29.3 | 70.3 | 240 (Incompatible Spews Oil) | — | — | — |

TABLE D-continued

| Example No. | Coupler No. | % Coupler/Wt. | % Polymer/Wt. | % Paraffin Oil/Wt. | % Polymer Extension | Dielectric Constant At 1KH$_z$* | Volume Resistivity In OHM-cm* | Dissipation Factor At 1KH$_z$* |
|---|---|---|---|---|---|---|---|---|
| II | 1 | 15.0 | 8.0 | 76.3 | 953 | 2.55 | 2.45 × 10$^{13}$ | .009 |
| III | 2 | 20.0 | 15.0 | 64.8 | 432 | 2.73 | 4.18 × 10$^{12}$ | .011 |
| IV | 3 | 20.0 | 15.0 | 64.0 | 427 | 3.01 | 1.33 × 10$^{11}$ | .017 |
| V | 4 | 25.0 | 8.0 | 66.8 | 835 | 2.68 | 1.36 × 10$^{13}$ | .007 |
| VI | 5 | 20.0 | 15.0 | 64.0 | 427 | 2.74 | 6.10 × 10$^{11}$ | .017 |
| VII | 6 | 24.8 | 12.4 | 61.4 | 495 | 3.29 | 1.53 × 10$^{13}$ | .029 |
| VIII | 7 | 24.8 | 12.4 | 61.6 | 497 | 2.74 | 2.59 ×0 10$^{10}$ | .016 |
| IX | 1 | 20.0 | 15.0 | 64.0 | 427 | 2.71 | 3.47 × 10$^{12}$ | .007 |
| X | 13 | 20.0 | 15.0 | 64.5 | 430 | 2.99 | 6.89 × 10$^{12}$ | .015 |
| XI | 14 | 20.0 | 15.0 | 64.5 | 430 | 3.42 | 3.44 × 10$^{10}$ | .025 |
| XII | 15 | 20.0 | 15.0 | 64.5 | 430 | 3.23 | 1.07 × 10$^{11}$ | .017 |
| XIII | 4 | 30.0 | 35.0 | 35.0 | 100 | 3.0 | 2.43 × 10$^{13}$ | .015 |

*Electrical measurements made at 25° C.

The resulting clear solution within 4 hours turned opaque and within 24 hours cured at room temperature to a greyish-white, opaque oil spewing mass containing 29.3% polymer which was incompatible with the 70.3% mineral oil.

EXAMPLE II a. Prepolymer Formation

Same prepolymer as in Example I.

b. Polymer Formation 6.4 grams (.004 eq.) of the prepolymer was mixed with 4.8 grams (.004 eq.) of the hydroxyl bearing polybutadiene, 73.1 grams of mineral oil, 15.0 grams of 2,2,4 trimethyl 1,3 pentanediol, diisobutyrate and 0.7 grams of dibutyl tin dilaurate. The resulting solution cured over a 120 hour period to a clear, very soft, dry, non-oil spewing mass which contained 8% polymer and 76.3% mineral oil. This represents a 953% extension of the polymer by mineral oil.

EXAMPLE III a. Prepolymer Formation

Same as prepolymer as in Example I.

b. Polymer Formation 16.3 grams (.01 eq.) of prepolymer was mixed with 1.5 grams (.0045 eq.) of castor oil, 5.3 grams (.0045 eq.) of a hydroxyl bearing polybutadiene, 56.6 grams of mineral oil, 20.0 grams of di-2-ethylhexyl sebacate, and 0.3 grams of dibutyl tin dilaurate. The resulting solution cured over a 48 hour period at room temperature to a clear, soft, dry, non-oil spewing mass containing 15% polymer and 64.8% mineral oil. This represents a 432% extension of the polymer with mineral oil.

EXAMPLE IV a. Prepolymer Formation

Same prepolymer as in Example I.

b. Polymer Formation 13.2 grams (.0074 eq.) of prepolymer was mixed with 4.7 grams (.0037 eq.) of a hydroxyl bearing polybutadiene, 3.7 grams (.0037 eq.) of a polypropylene glycol, 20.0 grams of acetyl tributyl citrate, 57.4 grams of mineral oil and 1.0 grams of dibutyl tin dilaurate. The resulting solution cured over a 48 hour period at room temrature to a clear, soft, dry, non-oil spewing mass containing 15% polymer and 64% mineral oil. This represents a 426% extension of the polymer with paraffin oil.

EXAMPLE V a. Prepolymer Formation

A reactor vessel equipped as in Example I was charged with 52.2 grams (0.6 eq.) of toluene diisocyanate (80/20), 181.3 grams of mineral oil, 120.9 grams of di-2-ethylhexyl adipate, and 250.0 grams (0.2 eq.) of a hydroxyl bearing polybutadiene, and 0.3 grams of benzoyl chloride. The solution was heated under nitrogen for 4 hours at 75°-80° C. The resulting prepolymer had a free isocyanate content of 2.57%.

b. Polymer Formation 6.3 grams of the prepolymer (0.039 eq.) was mixed with 4.8 grams (.0039 eq.) of a hydroxyl bearing polybutadiene, 23.7 grams of di (2-ethylhexyl) adipate, 65.0 grams of mineral oil and 0.2 grams of dibutyl tin dilaurate. The solution cured at room temperature over a 120 hour period to a clear, very soft, dry, non-oil spewing mass containing 8% polymer and 66.8% mineral oil. This repesents an 835% extension of the polymer by mineral oil.

EXAMPLE VI a. Prepolymer Formation

A reactor equipped as in Example I was charged with 2487.0 grams (1.8 eq.) of a triol (derived from the reaction of propylene oxide and trimethylol propane) 600 grams of 3 isocyanatomethyl 3,5,5, trimethylcyclohexyl isocyanate (5.4 eq.), 1.6 grams of benzoly chloride, and 1.6 grams of dibutyl tin dilaurate. The solution was heated at 80° C for 6 hours under nitrogen. The resulting prepolymer had a free isocyanate content of 4.85%.

b. Polymer Formation 6.4 grams (.0074 eq.) of the prepolymer, 8.6 grams of a hydroxyl bearing polybutadiene (.0048 eq.), 20.0 grams of diisodecyl phthalate, 64.0 grams of mineral oil and 1.0 grams of dibutyl tin dilaurate were mixed. The resulting solution cured at room temperature over a 48 hour period to a clear, soft, dry, non-oil spewing mass containing 15% polymer and 64% mineral oil. This represents a 427% mineral oil extension of the polymer.

EXAMPLE VII a. Prepolymer Formation

A reaction vessel equipped as in Example I as well as with a dropping funnel, was charged with 386.0 grams (4.44 eq.) of toluene diisocyanate 614.0 grams of castor oil (1.8 eq.) was added, over a 2 hour period, through the dropping funnel at 70°–80° C. After the addition was complete, the reactor was held at 75° C for 1 hour. The free isocyanate content of the prepolymer was 10.8%.

b. Polymer Formation 3 grams (.0076 eq.) of the prepolymer was mixed with 9.4 grams (.0076 eq.) of a hydroxyl bearing polybutadiene, 24.8 grams of dioctyl adipate, 61.4 grams of paraffin oil and 1.4 grams of dibutyl tin dilaurate. The resulting solution cured at room temperature over a 48 hour period to a soft, clear, dry, non-oil spewing mass which contained 12.4% polymer and 71.4% mineral oil. This represents a 495% extension of the polyurethane with mineral oil.

EXAMPLE VIII a. Prepolymer Formation

Same prepolymer as in Example VII.

b. Polymer Formation 2.4 grams (.0061 eq.) of the prepolymer was mixed with 10.0 grams of a hydroxyl bearing copolymer of styrenebutadiene (.0061 eq.), 24.8 grams of tributyl phosphate, 61.4 grams of mineral oil and 1.2 grams of dibutyl tin dilaurate. The resulting solution cured at room temperature over a 48 hour period to a soft, clear, dry, non-oil spewing mass containing 12.4% polymer and 61.6% mineral oil. This represents a 497% mineral oil extension of the polyurethane.

EXAMPLE IX a. Prepolymer Formation

A reactor fitted with agitator, thermometer nitrogen inlet and reflux condenser was charged with 1001.8 grams (1 eq.) of a polytetramethylene glycol and 555.5 grams (5 eq.) of 3-isocyanatomenthyl, 3,5,5 trimethylcyclohexyl isocyanate. The solution was maintained at 80° C for 2 hours. The resulting prepolymer had a free isocyanate content of 10.12%.

b. Polymer Formation 3.7 grams (.0089 eq.) of the prepolymer was mixed with 11.3 grams (.0089 eq.) of a hydroxyl bearing polybutadiene (OH functionality 2.3 – 2.4) 64.0 grams of a mineral oil, 20.0 grams of 2,2,4 trimethyl — 1,3 pentanediol diisobutyrate and 1.0 grams of dibutyl tin dilaurate. The resulting solution cured after 1-½ hours at 100° C to a clear, dry, non-oil spewing mass containing 15% polymer and 64% mineral oil. This represents a 427% mineral oil extension of the polymer.

EXAMPLE X a. Prepolymer Formation

Same prepolymer as in Example VII.

b. Polymer Formation 3.5 grams (0.009 eq.) of the prepolymer was mixed with 11.5 grams (.009) of hydroxyl bearing polybutadiene, 20.0 grams of isobutyl acetate, 64.5 grams of a mineral oil and 0.5 grams of dibutyl tin dilaurate. The resulting solution cured over a 24 hour period at room temperature of a soft, clear, dry, non-oil spewing mass which contained 15% polymer and 64.5% mineral oil. This was a 430% mineral oil extension of the polymer.

EXAMPLE XI a. Prepolymer Formation

Same Prepolymer as in Example I.

b. Polymer Formation 12.5 grams of prepolymer (0.0077 eq.) was mixed with 8.8 grams (0.0077 eq.) of a hydroxyl bearing polybutadiene, 20.0 grams of methyl-ethyl ketone, 58.2 grams of mineral oil and 0.5 grams of dibutyl tin dilaurate. The resulting solution cured at room temperature over a 48 hour period to a soft, dry, non-oil spewing mass containing 15% polymer and 64.5 percent mineral oil. This represents a 430% extension of the polymer by mineral oil.

EXAMPLE XII a. Prepolymer Formation

Same prepolymer as in Example VII.

b. Polymer Formation 3.5 grams (.009 eq.) of prepolymer was mixed with 11.5 grams (.009 eq.) of a hydroxyl bearing polybutadiene, 20.0 grams of methyl-n-butyl ketone, 64.5 grams of mineral oil and 0.5 grams of dibutyl tin dilaurate. The resulting solution cured at room temperature over a 24 hour period of a clear, soft, dry, non-oil spewing mass which contained 15% polymer and 64.5% mineral oil. This was a 430% mineral oil extension of the polymer.

EXAMPLE XIII a. Prepolymer Formation

A reactor vessel equipped as in Example 1 was charged with 145 grams (0.42 eq.) of castor oil, 286 grams polymeric MDI (2.16 eq.) and 569 grams dioctyl adipate (DOA) the solution was heated under nitrogen for 2 hours at 60° C. The resulting prepolymer had a free isocyanate content of 7.2%.

b. Polymer Formation 17.0 grams of the prepolymer (0.03 eq) were mixed with 26.2 grams (0.021 eq) of a hydroxyl bearing polybutadiene, 1.4 grams castor oil (0.004 eq) 35 grams of mineral oil, 20.1 grams of DOA and 0.3 grams dibutyl tin dilaurate. The solution cured at room temperature over a 24 hour period to a clear, firm, dry, non-oil spewing elastomeric material containing 35 percent polymer and 35 percent mineral oil. This represents a 100 percent extension of the polymer by mineral oil.

In the preceding examples the hydroxyl terminated liquid homopolymer of polybutadiene employed is available from the Altantic-Richfield Co. under the trade name POLY-BD R-45HT. Its typical properties are:

| Polybutadiene isomer content | Viscosity at 75° F. - 80 poise |
|---|---|
| Trans 1,4 - 60% | Moisture weight percent - 0.05 |
| Cis 1,4 - 20% | Iodine No. 398 |
| Vinyl 1,2 - 20% | Hydroxyl content - 0.85 Meg/GM |

The mineral oil used in the examples is available from Pennrico Inc., Butler, Pennsylvania as "PENETECK", a highly paraffinic white oil.

The materials produced in Examples I – XIII had an initial (low) viscosity on the order of about 0.1 poises. However, within about 1 to 120 hours the material cured in situ at temperatures from about 15° C. to about 100° C. to a gel-like (high) viscosity on the order of between 1,000 and 100,000 poises. The mineral oil was completely compatible with the prepolymer and polyol in all of Examples II – XIII. In each case the mineral oil did not interfere with the reaction of the prepolymer and polyol constituents to form a polyurethane compound which cured to a gel. In each instance the mineral extender oil did not exude or spew from the cured urethane system.

The elastomeric rehabilitation materials of this invention are ideally suited for use in reclaiming waterlogged electrical apparatus such as, for example, plastic insulated conductors of the type employed in multi-pair telephone cables. The method of employing these mineral oil extended urethanes in rehabilitating such an apparatus will now be illustrated with reference to FIG. 1.

In the cable illustrated in FIG. 1, a plurality of wire conductors 1 are disposed within the central core 2 of the cable. Each wire is surrounded by an insulating material, generally a polyolefin plastic. The plurality of insulated wires are tightly enclosed within a spiral wound sheath 3, usually a polyethylene terephthalate sheet material. Surrounding the sheath are two protective shields 4, made of a flexible metal sheeting such as aluminum. The shields are separated from one another by a continuous layer 5 of a suitable insulating material. Finally, an outer jacket 6 of a protective plastic such as polyethylene, covers the outermost aluminum layer and serves to protect the cable.

Aqueous contaminants generally find their way into the cable through pinholes and stress cracks that develop around fittings and cable connectors, ultimately lodging in the interior free spaces of central core 2. After a particular aqueous contaminant, for example water, has been present for some time in the core, the electrical properties of the cable can be deleteriously effected as previously described. At this point, the rehabilitation products and processes of this invention may be employed to restore the cable to substantially its original operating condition.

The rehabilitation operation is carried out on location by first admixing approximately equal amount of the prepolymer and polyol ingredients which are most advantageously prepared in advance. A small portion of the cable outer protective layers including jacket 6, aluminum protective shields 4 and sheath 3 are then removed and a nipple (not shown) installed in the opening thus formed, using techniques that are well-known in the trade. This operation can be carried out from above, or below, and without removing the cable from its resting place. The mineral oil extended polyurethane elastomer having just been formed has a relatively low viscosity and is easily introduced into the core of the cable through a hose (not shown) connected to the nipple. After the rehabilitation material has been injected into the cable, the delivery hose is withdrawn from the nipple and the hole in the nipple is sealed with a plug (not shown). The injection operation will have driven the low viscosity mineral extended urethane out through the interior-free spaces of the cable. The rehabilitation agent will displace the water penetrants in the interior free spaces (e.g. between the individual wires and the outer polyethylene terephthalate sheath).

In the practice of the invention, the viscosity of the rehabilitation material at from about 15° C. to about 50° C. at the time of injection should be within the range of about 10 to 100 centipoises. Within several hours after injection into an insulated electrical device, the rehabilitation agent cures to form an oil extended polymer system having a gel-like consistency and a viscosity on the order of about 1000 poises. The clear gel is physically and chemically stable and does not lose mineral oil by exudation or spewing. The hydrophobic nature of the cured oil extended elastomer system also serves to seal the cable against subsequent penetration of water or other fluid materials. Furthermore, the gelled system has good insulating properties due to its relatively low dielectric constant and high volume resistivity.

The elastomer material retains the mineral oil and no exudation was evident in any of the formulations made in Examples II – XII after standing for several weeks at ambient (room) temperature. Moreover, the mineral oil extended urethanes were found to be compatible with the polycarbonate plastic connectors used in the interconnection of insulated electrical devices. After several weeks' exposure to the rehabilitation compounds of this invention, the polycarbonate connectors on plastic insulated conductor cable were completely unaffected and did not exhibit any signs of chemical attack. The rehabilitation compounds were also compatible with polyolefin insulating materials used in the cable manufacture and no stress cracking was observed after several weeks exposure.

The oil extended rehabilitation material was non-solvating in nature and did not attack polyethylene terephthalate or the other polymer materials employed in the cable construction. The material was also characterized by easy handling in view of its low volatility (vapor pressure) and inoffensive aroma. No toxicity or adverse side effects have been noted by those handling the rehabilitation materials of this invention, thus setting them apart from the relatively toxic products previously employed in reclamation techniques.

The treated cable showed only a minor weight gain, which is probably attributable to the low density of the cured rehabilitation material. It has also been noted that the present system results in only a minimal amount of air being entrapped in the cured system after injection into an insulated electrical device. This can be related to the low viscosity and density of the initial ingredients which may be pumped into the cable without causing excessive turbulence.

In addition to the reclamation of insulated electrical apparatus, the mineral oil polymer system can also be used as a waterproofing membrane in the construction field, cast into a resilient flooring compound (using higher level of polymer as represented by Example XIII); used as a liquid casting system for a variety of potting and encapsulation applications as well as a solid lubricant to replace grease in certain situations.

While this invention has been described and illustrated by the examples shown, it is not intended to be strictly limited thereto, and other variations and modifications may be employed within the scope of the following claims.

We claim:

1. A mineral oil extended polyurethane system comprising the reaction product of an isocyanate terminated prepolymer with a polyol in the presence of a mineral and a liquid coupling agent for compatibilizing said mineral oil with said polyurethane, said polyurethane system containing from about 8 to about 20 parts of said urethane polymer, from about 60 to about 75 parts mineral oil and from about 10 to about 25 parts of coupler, all parts expressed on a weight basis, said liquid coupling agent being miscible in all proportions with said mineral oil, said coupling agent selected from the group consisting of a ketone and an ester of an organic compound selected from the group consisting of a diol and a diacid, said agent having a boiling temperature above 220° F., a solubility parameter between 7.0 and 9.5 and a hydrogen bonding index number in the range from 8.2 to 8.8, said isocyanate terminated prepolymer selected from the group consisting of cycloaliphatic diisocyanate, aliphatic diisocyanate and aromatic diisocyanate; said polyol selected from the group consisting of castor oil and polyether wherein at least one of said urethane forming reactants include a hydroxy bearing polybutadiene constituent, the mineral oil extended polyurethane when cured retaining the mineral oil within its structure, thereby preventing the oil from spewing and exuding from said cured composition, said composition possessing a gel-like consistency.

2. Product according to claim 1 in which the mineral oil employed is paraffin oil 3. Product according to claim 1 in which the liquid coupling agent is 2,2,4-trimethyl 1,1,3-pentane diol diisobutyrate.

4. Product according to claim 1 in which the coupling agent is di-2 ethyl hexyl adipate.

5. Product according to claim 1 wherein said isocyanate terminated prepolymer is the reaction product of 3-isocyanatoemethyl 3,3,5-trimethylcyclohexyl isocyanate and a liquid hydroxyl terminated homopolymer of butadiene.

6. A mineral oil extended polyurethane system comprising the reaction product of an isocyanate terminated prepolymer with a polyol in the presence of a mineral oil and a liquid coupling agent for compatibilizing said mineral oil with said polyurethane, said polyurethane system containing from about 8 to 45 parts of said urethane polymer, from about 25 to about 75 parts mineral oil and from about 10 to about 35 parts of coupler, all parts expressed on a weight basis, said liquid coupling agent being miscible in all proportions with said mineral oil, said coupling agent selected from the group consiting of a ketone and an ester of an organic compound selected from the group consisting of a diol and a diacid, said agent having a boiling temperature above 220° F., a solubility parameter between 7.0 and 9.5 and a hydrogen bonding index number in the range from 8.2 to 8.8, said isocyanate terminated prepolymer selected from the group consisting of castor oil and polyether wherein at least one of said urethane forming reactants include a hydroxy bearing polybutadiene constituent, the mineral oil extended polyurethane when cured retaining the mineral oil within its structure, thereby preventing the oil from spewing and exuding from said cured composition, said composition possessing a gel-like consistency.

7. A mineral oil extended polyurethane system comprising the reaction product of an isocyanate terminated prepolymer with a polyol in the presence of a mineral oil and a liquid coupling agent for compatibilizing said mineral oil with said polyurethane, said polyurethane system containing from about 20 to about 45 parts of said urethane polymer, from about 25 to about 60 parts mineral oil and from about 25 to about 35 parts of coupler, all parts expressed on a weight basis, said liquid coupling agent being miscible in all proportions with said mineral oil, said coupling agent selected from the group consisting of a ketone and an ester of an organic compound selected from the group consisting of a diol and a diacid , said agent having a boiling temperature above 220° F., a solubility parameter between 7.0 and 9.5 and a hydrogen bonding index number in the range from 8.2 to 8.8, said isocyanate terminated prepolymer selected from the group consisting of cycloaliphatic diisocyanate, aliphatic diisocyanate and aromatic diisocyanate; said polyol selected from the group consisting of castor oil and polyether wherein at least one of said urethane forming reactants include a hydroxy bearing polybutadiene constituent, the mineral oil extended polyurethane when cured retaining the mineral oil within its structure, thereby preventing the oil from spewing and exuding from said cured composition, said composition being useful as a casting system.

8. Composition according to claim 1 which preferably contains about 12-½ to about 15 parts by weight of said urethane polymer, about 65 to about 70 parts of mineral oil and from about 15 to about 20 parts by weight of coupler.

* * * * *